April 27, 1926.

R. BASRALIAN

PHOTOPRINTING MACHINE

Filed June 6, 1925

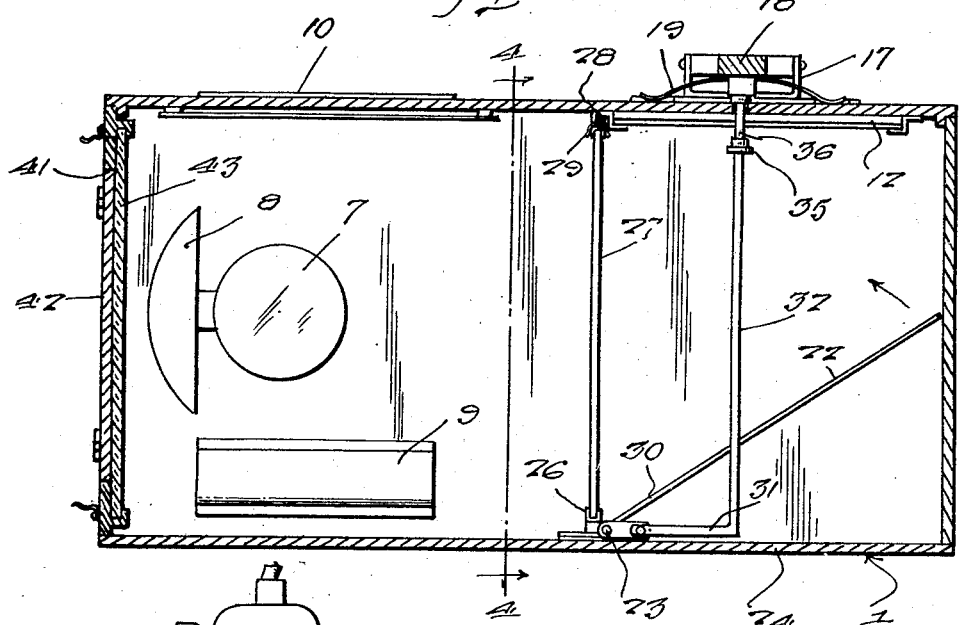
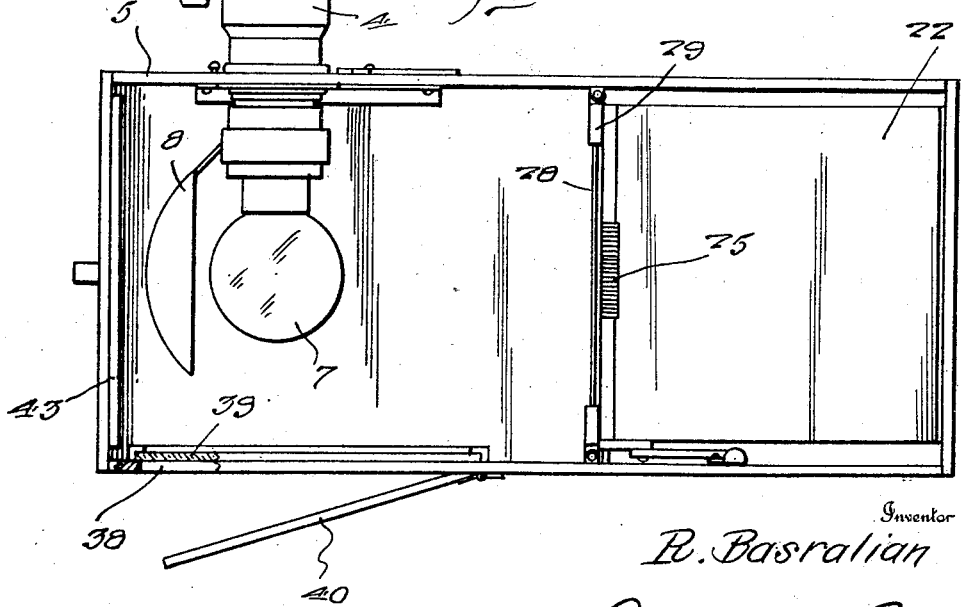

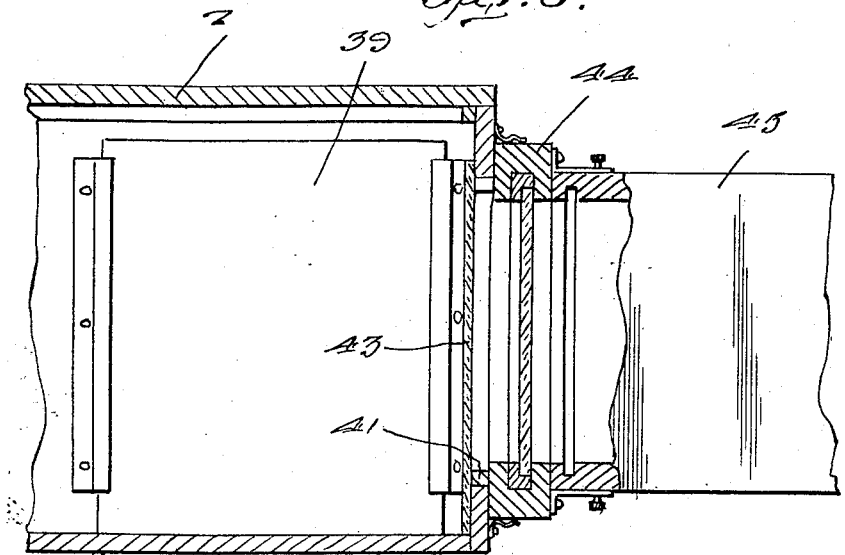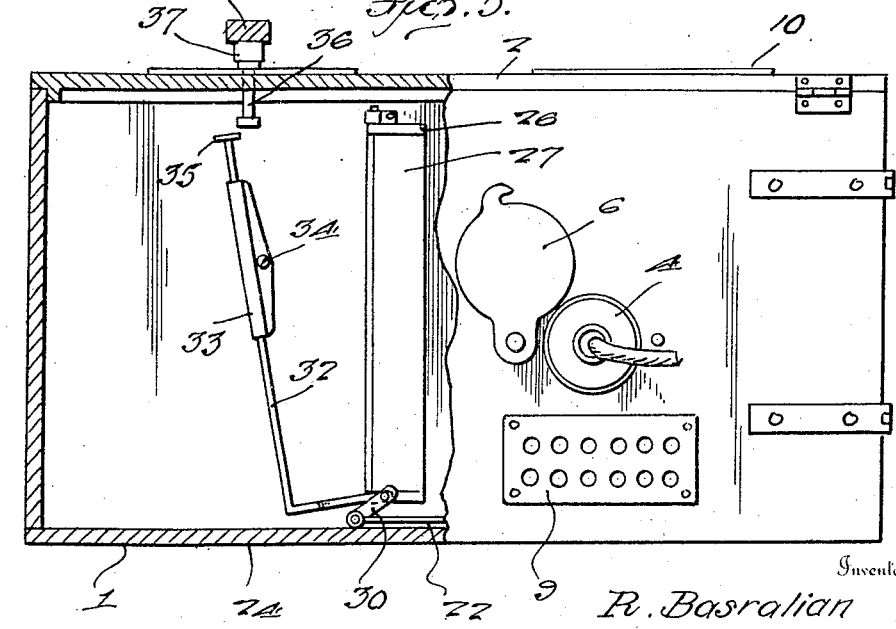

Patented Apr. 27, 1926.

1,582,371

UNITED STATES PATENT OFFICE.

RICHARD BASRALIAN, OF WEST HOBOKEN, NEW JERSEY.

PHOTOPRINTING MACHINE.

Application filed June 6, 1925. Serial No. 35,487.

*To all whom it may concern:*

Be it known that I, RICHARD BASRALIAN, a citizen of the United States, residing at West Hoboken, in the county of Hudson and State of New Jersey, have invented certain new and useful Improvements in Photoprinting Machines, of which the following is a specification.

This invention relates to a photoprinting machine, especially adapted for the use of amateur photographers.

An object of the invention resides in providing a printer of the character above mentioned, which includes a housing having a hinged cover which is adapted to form a light box, and in which is suitably mounted a movable partition wall adapted to divide the housing into a pair of compartments and movable for controlling the projection of light within the compartment, and relative to the sides and top thereof.

Another object of the invention is to provide a photographic printer including a housing having a hinged cover mounting a suitable photographic printing mechanism in said cover, in conjunction with which suitable operating means is operated and controlled to effect the movement of the movable partition within the housing, dividing the same normally into compartments, and which movable partition also controls the projection of light from the light sources in one of the compartments.

A further object of the invention is to provide a photographic printer of the above mentioned character which includes a housing provided with a hinged cover, in which a suitable opening is formed for receiving printing frames adapted to hold a negative to be printed and to the end of which opening is pivoted suitable backing members for the negative and print paper for holding the same in the frame in proper relation during the printing thereof, suitable means being removably attached to the cover in a convenient manner, operable to hold the backing members, the print paper and the film negative, in such position by resiliently engaging the backing members and forcing the same into the opening formed in the cover.

The invention includes other objects and improvements in the details of construction and arrangement of the parts for carrying out the objects of the invention, as above set forth and as will be apparent in the following detailed description and claims directed to a preferred form of the construction, it being understood, however, that various changes may be made, in the size, shape and arrangement of parts for carrying out the invention, without departing from the spirit and scope of the invention as herein set forth.

In the drawing, forming a part of this application:

Figure 1 is a plan view of the improved photographic printer, forming the subject of this invention.

Figure 2 is a vertical longitudinal section, through the photographic printer, taken on the line 2—2 of Figure 1.

Figure 3 is a plan view, looking into the inside of the housing, the cover having been removed.

Figure 4 is a vertical transverse sectional view, taken on the line 4—4 of Figure 2.

Figure 5 is a side elevation of the rear side of the photographic printer with portions shown in section and illustrating the movable position and operating parts therefor in inoperative position.

Figure 6 shows a horizontal sectional view through one end portion of the photographic printer, showing an enlarging attachment connected therewith.

Figure 7 is a disassembled perspective view of a portion of the lid or cover of the photographic printer and the mechanism for holding the backing for the printing paper in closed position, illustrating the detachable mounting of the backing holding mechanism with the cover.

Figure 8 illustrates a clip adapted to be removably positioned over the upper edges of the movable transparent ring pivotally mounted on the inside of the side walls of the printer for cooperation with the movable partition when the same is in operative position.

1 indicates the main housing of the printer, which is open at the upper end and on which is hingedly connected the cover 2, by suitable hinges at 3, a lamp socket 4 being removably mounted in the rear wall 5 of the housing 1, and at one end portion thereof, the opening through which the socket projects being closed by suitable pivoted covers 6, when the socket is not positioned therein. This lamp socket suitably supports the lamp 7 in one end of the housing and also a reflector 8, removably mounted on the end of the socket within the housing, in any desired manner, so that it may be positioned to reflect the light in a suitable direction within the housing.

The back wall of the housing, below the portion receiving the socket 4 is provided with a suitable ventilating structure indicated at 9, to permit the inlet of cool air into the casing, in order to prevent the accumulation of heat therein from the lamp bulb 7, the heated air being exhausted through the ventilator structure 10, mounted in the cover 2, immediately above the lamp 7.

The end of the cover, at the end of the housing opposite that to which the lamp is positioned is formed with a substantially large opening 11, and below which is suitably supported on the bottom face of the cover a clear glass plate 12, by suitable brackets to form a frame for receiving negative and printing paper in such relation that the film may be suitably printed on the print paper by eliminating the interior of the housing in a manner as will be hereinafter set forth. At the rear edge of the opening 11 is suitably hinged a bracket member 13, hingedly connected together at their adjacent edges, which are of a size adapted to fit within the opening 11 and entirely close the same, so that when the negative and printing paper are properly arranged within the opening 11, said bracket member will hold the same in contact with the glass plate and in proper position for printing. In the rear of the opening 11, the cover 2 is formed to receive, on the upper face thereof, a plate member 14 which is provided with T-slots 15, for receiving the headed projections 16 on the bracket members 17, which pivotally mount a hand lever 18, carrying resilient strip members 19, in position to engage the central portion of the cover 13 when the said hand lever is moved toward the cover 2. The provision of the headed projection 16 on the bracket member 17 provides a removable connection between the cover and the hand lever 18, so that when the device is to be carried about the base plate, the hand lever may be detachably and suitably stored within the housing. A spring pressed and manually operable latch 20 is mounted on the under side of the forward end of the lever 18 for suitable cooperation with the latch plate 21, mounted on the forward edge of the cover in front of the opening 11, so that the lever 18 may be retained in depressed position toward the cover 2, in order to hold the backing sections 13 in firm engagement in the opening 11, with the negative and printing paper and for holding the same firmly against the glass plate 12. A movable partition wall 22 is mounted on the shaft 23, which is rotatably mounted in suitable bearing members secured to the bottom wall 24, of the casing 1, so that the partition wall is hingedly mounted on said bottom wall. A suitable coil spring 25 is mounted around the central portion of the shaft 23, with one end engaging the partition wall 22 and the other end engaging the bottom of the housing 1, for normally moving the partition wall in the direction of the arrow in Figure 2, so that the same will lie flat against the bottom 24 of the housing 1, under the normal action of the spring 25. A pair of frame members 26 are hingedly mounted on the front and back walls of the casing or housing 1, and carries transparent plates 27 of suitable light restricting character, which are adapted to be swung inwardly in opposed and aligned relation transversely of the housing, and which extends from the bottom to the top portion thereof as is clearly illustrated in Figure 4. These frames 26 and transparent plates 27 are now in formation and in the position shown in Figure 4 adapted to receive a suitable retaining member 28 having a pair of U-shaped clips 29 which fit over the upper edges of the frame 26, and retain the frames in inwardly projecting relation as shown in Figure 4 in the housing. In this position, these plates form a stop to limit the movement of the partition wall 22, so that the same will be held in a substantially vertical and transverse position within the housing 1. In this position of the partition wall 22, the housing will be divided into a pair of compartments, one of which will be lighted by the lamp 7 and the other compartment being substantially dark, through the light being cut off by the partition 22. A small portion of the light, however, will be admitted to the other compartment around the edges of the partition 22, which terminates in spaced relation with the front and rear walls of the housing. The light admitted to the second compartment within the housing when the partition wall is in a vertical transverse plane as just described, will be controlled by the plates 27, which are of suitably colored glass, for instance, yellow glass, to admit only certain rays from the lamp 7 to illuminate the compartment at the opposite end of the housing.

A suitable controlling means for the position of the partition wall 22 is provided, to control the position of the partition wall in accordance with the operation of the lever 18. This mechanism includes an arm 30 rigidly mounted on the shaft 23, with which is connected the laterally extending end 31 of the rod member 32. This rod member is suitably and slidably mounted in a holder 33, which is pivotally mounted at 34, on the front wall of the housing. The upper end of the rod member 32 projects above the holder 33 and receives a suitable head 35, which is adapted to be engaged by the head on the operating pin 36, mounted for limited sliding movement in the cover 2. This pin 36 is mounted in the path of movement of the lever 18, so as to be engaged by the stud 37 mounted on the under side of the lever 18, when the same is moved to depressed position as illustrated in Figure 4, with the latch 20 engaged with the latch plate 21. When the partition wall 22 is in a substantially vertical position, limited in its movement by the plates 27, the head 35 will be in the path of movement of the pin 36 so that when the negative is to be printed and the lever 18 depressed to hold the backing sections within the opening 11, the partition wall will be swung to an inclined position through the operation of the rod 32, by the pin 36, as illustrated in Figure 2. In this position of the partition wall, as illustrated in Figure 2, the light from the lamp 7 will be reflected upwardly thereby at the proper angle for concentration upon the glass plate 12, so that it will properly print the negative on the print paper positioned in the opening 11. The light admitted past the partition wall 22 in the vertical position thereof through the plate 27 is only sufficient to permit the operator of the printer to properly position the negative in the opening 11, with the print paper in proper position thereon.

At the end of the housing in which the lamp 7 is mounted, the front wall is provided with a suitable opening 38, and over said opening on the rear face of the front wall is mounted a suitable semi-transparent plate structure 39, adapted to permit the light from the lamp 7 to shine outwardly through the plate structure so as to provide the proper character of light as used in a dark room, and ordinarily referred to as a ruby light. A suitable door 40 is hinged along one edge of this opening 38 and forms a closure therefor when the light from the plate structure 39 is not desired.

The end of the housing 1, adjacent the lamp 7 is formed with an opening 41 closed by a suitable hinged jaw 42, and over the back of which is suitably mounted on the inside face of the end wall, a ground glass plate 43, to form a light diffusing member. Referring particularly to Figure 6, a frame 44 may be removably positioned in the opening 41, for holding the negative, so that enlargements may be made with a suitable enlarging apparatus of any desired structural character, as indicated by the numeral 45. The ground glass plate, in this connection, serves as a light diffusing medium, so as to properly distribute the light from the lamp 7, over the surface of the negative held in the frame 44. The plate 43 may also serve in connection with a photographic attachment applied to the end of the case or housing, so that a suitable view to be photographed may be focused upon the plate 43, but in such a manner that the actual focus of the image will occur in the plane of the negative placed in the frame 44, so that in the subsequent positioning of the negative plate within the frame 44, after the focusing of the image, the picture can be taken on the negative plate in the usual and well known manner, the light 7 being extinguished during the taking of pictures as described.

This construction is adapted to have the parts disassembled so that the lever 18, the lamp socket 4 and other parts of the photographic apparatus such as the paper, negative and other developing apparatus may all be stored within the housing 1, when the same is not used in order that it may be conveniently carried about from one place to another. For this purpose, the clip member 28 is removed from the frame 26 to permit the same to swing against the front and rear walls of the housing respectively, so that the partition wall 22 may be moved on its pivot under the influence of the spring 25, so as to rest against the bottom 24 thereof. In this position of the parts, the rods 32 will assume the position illustrated in Figure 5 of the drawings, so that the cover 2 may be applied and suitably locked to close the open end of the housing and the pin 36 will be out of alignment with the head 35, so as not to operate the movable partition 22 in the manner as heretofore described, as shown in Figure 2.

It will thus be seen that a highly practical and novel photographic printer has been produced, which is capable of efficiently printing photographs as well as serving a number of additional purposes.

What is claimed is:

1. A device of the class described comprising a housing having an open upper end, a cover hingedly connected to said housing and adapted to close the open end thereof, one end portion of said cover being provided with an opening, a glass plate mounted on the under face of the cover over said opening, adapted to form a print holder, backing plate hingedly connected to the cover and adapted to fit in said opening therein, a hand lever pivotally connected to the cover, having resilient means thereon for engaging said backing plate in the movement thereof toward the cover, for holding said plate in said opening, a rack member for locking the hand lever in one position adjacent the cover for retaining the backing plate to the opening, a partition wall pivotally mounted in the central portion of the casing normally retained in a transverse position within the housing to divide the same into a pair of compartments, a lamp mounted in the casing and projecting into one of said compartments for providing a source of light within the housing, and means operable by said hand lever for operating said partition wall to move the same to an inclined position under said glass plate for reflecting the light from said lamp toward said glass plate when the hand lever is latched to said cover.

2. A device of the class described comprising a housing having an open upper end, a cover hingedly connected to said housing and adapted to close the open end thereof, one end portion of said cover being provided with an opening, a glass plate mounted on the under face of the cover over said opening adapted to form a print holder, backing plate hingedly connected to the cover and adapted to fit in said opening therein, a hand lever pivotally connected to the cover, having resilient means thereon for engaging said backing plate in the movement thereof toward the cover for holding said plate in said opening, a rack member for locking the hand lever in one position adjacent the cover for retaining the backing plate to the opening, a partition wall pivotally mounted in the central portion of the casing normally retained in a transverse position within the housing to divide the same into a pair of compartments, a lamp mounted in the casing and projecting into one of said compartments for providing a source of light within the housing, means operable by said hand lever for operating said partition wall to move the same to an inclined position under said glass plate for reflecting the light from said lamp toward said glass plate when the hand lever is latched to said cover, and a pair of colored plate members hingedly connected to opposite side walls of said housing, and a removable clip member to retain said colored plates in position to limit the movement of the partition wall in one direction for holding the same extended in a transverse plane within the housing, and permitting the projection of a limited amount of light therethrough around said partition wall into the chamber in said housing under said glass plate.

3. A device of the class described comprising a housing having an open upper end, a cover hingedly connected to the housing and adapted to close the upper end thereof, said cover being formed adjacent one end thereof with an opening therethrough, a glass plate mounted on the under side of said cover over said opening, hingedly connected backing sections pivotally connected to said cover and adapted to fit within the opening therein for retaining the negatives and paper within said openings against the glass plates, a plate member mounted adjacent said opening on said cover and formed with a plurality of T-slots, and a bracket member having a plurality of headed studs thereon adapted for detachable engagement with said plate member, the head of the bracket member projecting through the T-slots of the plate member, and a hand lever pivotally mounted in said bracket member and having resilient means for engaging the backing sections for resiliently retaining said backing sections in the openings in said covers, and a latch member carried by the hand lever for cooperation with the cover to lock the same adjacent thereto for retaining the backing sections in said openings.

In testimony whereof I affix my signature.

RICHARD BASRALIAN.